March 14, 1950 R. K. POTTER 2,500,431
VISUAL REPRESENTATION OF COMPLEX WAVES
Filed Dec. 6, 1946 2 Sheets-Sheet 1

INVENTOR
R. K. POTTER
BY
Robert J. Fluskey
ATTORNEY

INVENTOR
R. K. POTTER
BY
Robert J. Pluskey
ATTORNEY

Patented Mar. 14, 1950

2,500,431

UNITED STATES PATENT OFFICE 2,500,431

VISUAL REPRESENTATION OF COMPLEX WAVES

Ralph K. Potter, Morristown, N. J., assignor to Bell Telephone Laboratories, Incorporated, New York, N. Y., a corporation of New York Application December 6, 1946, Serial No. 714,619

20 Claims. (Cl. 179—1)

This invention relates to the visual representation of complex waves, and more particularly, to the analysis and visual representation of speech-carrying waves.

An object of the invention is to improve arrangements and means for producing visual patterns or spectrograms respective to specific speech sounds or a sequence of speech sounds.

In accordance with the invention, speech-bearing waves to be visually represented are converted into complex electric waves corresponding thereto, and the latter are divided or separated into a multiciplicity of component frequencies or frequency bands. Signals or signal waves corresponding to or derived from the frequencies or frequency bands are then analyzed or scanned electronically repeatedly and at successive time intervals, and such analysis or scanning is visually displayed or recorded in the form of a pattern or spectrogram. In one form of pattern, one coordinate of the latter may have the significance of a frequency dimension or parameter of the analyzed waves, and another coordinate that of wave intensity or amplitude. In another form of pattern, two of the coordinates of the pattern may have the significance of frequency and time, respectively, with wave intensity or amplitude for a particular frequency at a particular instant in the time sequence being evidenced by a characteristic, for example, brightness or darkness, of the pattern at the intersection on the pattern of the selected frequency and time values.

In accordance with the invention, the visual pattern for the complex wave is displayed by means of a cathode ray tube or oscilloscope in which an electron beam is caused repeatedly and cyclically to traverse a path between limits on an electron beam sensitized surface. The beam is caused to move between or across a plurality of beam controlling means, each of which is respective to or has applied to it signals or signal waves corresponding to or derived from the component frequencies or frequency bands into which the complex waves have been separated. As the beam successively traverses the region or field of control of each such beam controlling means, it is laterally deflected or otherwise operated on to vary its effect on the sensitized surface, in accordance with a characteristic of the signals or signal waves applied to each beam controlling means during the time interval that the beam is traversing the respective field or region of control. A wave or signal smoothing network or networks may be included in the required circuit arrangement, and the beam controlling means may be relatively disposed so as to have overlapping effects on the moving beam.

A more complete understanding of the invention will be obtained from detailed description that follows, taken in conjunction with the appended drawings, wherein.

Figure 1:
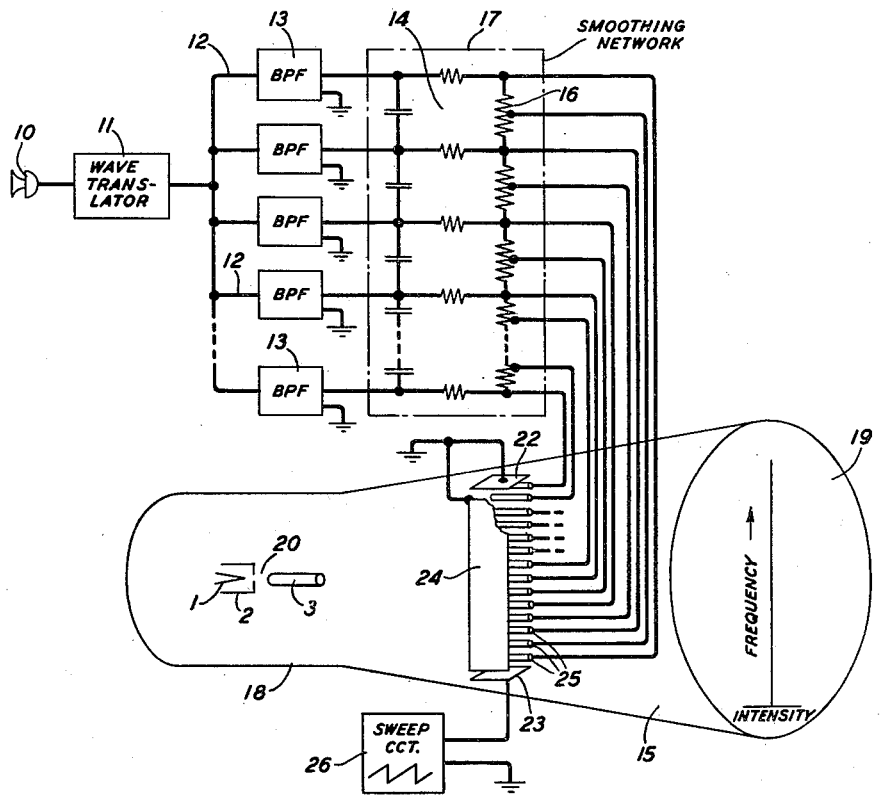
Fig. 1 shows an arrangement in accordance with the invention for producing visual patterns respective to speech-bearing waves.

Fig. 1 shows an arrangement in accordance with the invention for producing a visual representation or pattern of speech-bearing waves or the like. It comprises a sound wave energy pick-up device or microphone 10, for translating speech-bearing waves into complex electric currents corresponding thereto; a wave translator or modifier circuit 11, for automatic volume control, shaping, equalizing or other desired modification of the complex currents; a plurality of frequency selective or frequency range dividing channels 12, each comprising a filter 13 of the band-pass type and a smoothing network 14; and a visual indicator device or cathode ray oscilloscope 15. Each band-pass filter is selective to a different portion only of the frequency range expected to be embraced by the speech-bearing waves to be analyzed and visually represented on the indicator device. If, for example, the frequency range of interest were considered to be that of 0–3600 cycles per second, fourteen filters might be an appropriate number to employ, with each filter having a pass band approximately 250 cycles wide, and each being selective to a different band of frequencies. If desired, however, a greater or lesser number of band-pass filters could be used with attendant variation in the filter band width and the frequency band selectivity. The smoothing network for each filter may comprise appropriately proportioned resistive and capacitive impedances, and as illustrated, may interconnect the outputs of adjacent filters to a desired degree. The voltage dividers or potentiometers 16 are connected to certain electrodes of the oscilloscope. The individual smoothing network, obviously, may be considered as a portion of a single composite network 17 for the outputs of all of the filter. The oscilloscope may comprise an enclosing vessel 18 having an enlarged fluorescent screen or viewing area end portion 19, and enclosing an electron gun 20 at its opposite end portion. The electron gun or source of cathode ray or electron beam to be directed against the screen may comprise a cathode, control electrode 2 and accelerating anode 3. The vessel also encloses a plurality of electron beam control or deflector electrodes or elements comprising a pair of spaced parallel plates 22, 23, an elongated plate electrode 24 disposed substantially at right angles to the plates 22, 23, and a plurality of elongated electrodes or wires 25 spaced from one another substantially in parallel and each spaced substantially the same distance from the plate electrode 24. A sweep circuit 26 is connected across the plates 22, 23, for repeatedly and cyclically causing the electron beam at a preassigned rate to be deflected or moved back and forth in one direction, herein indicated as vertically, to produce a luminous line trace on the screen 17 in the absence of input to the electrodes 24, 25.

Figure 2:
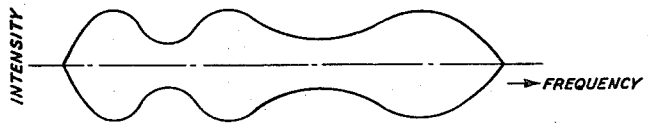
Fig. 2 is illustrative of a pattern obtainable with the Fig. 1 arrangement.

The operation of the Fig. 1 arrangement will now be described. Speech-bearing waves incident on the microphone are converted thereby into electrical currents of corresponding frequency and wave power content, which, after desired automatic volume control, shaping or other modification in circuit 11, are applied to the inputs of the band-pass filters. The latter divide the frequency range of the input wave into a plurality of component frequency bands, the respective bands of frequencies are applied to their respective smoothing networks, and to the control electrodes 25 respective to the network for a particular frequency band. The sweep voltage applied to the plates 22, 23 will normally cause the electron beam to be moved repeatedly and cyclically back and forth between preassigned extreme positions between the deflector plates and to produce a luminous straight-line trace of such movement on the screen of the oscilloscope. The normal path of electron beam may have the significance of a frequency coordinate, and in the arrangement illustrated the direction of ascending frequency will be from the lower extreme position of impact of the electron beam on the screen to its upper extreme position of impact. As the wave energy of the component frequency bands is applied to the electrodes 25, the electron beam will be deflected substantially at right angles to its normal path, the extent of lateral displacement at any instant being dependent on the amplitude of the energy at the particular frequency or in the particular frequency band passed by the filter to which the electrode or electrodes 25 causing such displacement are connected. By having the electrodes 25 relatively closely adjacent, adjacent ones thereof will have an overlapping effect on the instantaneous lateral displacement of the electron beam so that the latter will trace a fairly smooth curve on the screen, respective to the particular speech-bearing waves that were effective on the microphone. If the sweep rate is appropriately chosen, for the alternating current input to the vertically arranged deflector electrodes the screen will show a substantially solid figure bounded by symmetrical curves. The screen portion of the oscilloscope may be provided with a frequency scale, and a relative intensity or wave amplitude scale, as indicated, to facilitate recognition of a particular pattern by an observer, or to enable ready visual determination of the successive instantaneous frequency distribution respective to a particular speech sound or succession of speech sounds. The degree of smoothness of the pattern will be related to the spacing of the electrodes 25. The closer the spacing, the more uniform or smooth will be the resultant pattern; as the separation is increased, the pattern will approach that of the multitone type. Fig. 2 is illustrative of the symmetrical or envelope type pattern that would be produced on the oscilloscope screen. As the frequency distribution within the frequency range of the speech-bearing waves being received varies from instant to instant, the contour of the pattern will vary respective thereto as the component frequencies or frequency bands thereof are electronically scanned. The trained observer following such variations visually is thereby enabled to read the message or other content of the speech-bearing waves. If the outputs of the Fig. 1 filters are rectified, direct current signals respective to the component frequencies of the received waves will be applied to the electrodes 25 and the lateral displacements of the electron beam will be such as to trace a single curve, rather than the double curve illustrated by Fig. 2. Such rectifiers could be inserted between each filter and the smoothing network respective thereto.

Figures 3, 3A, 3B, 4, 5:
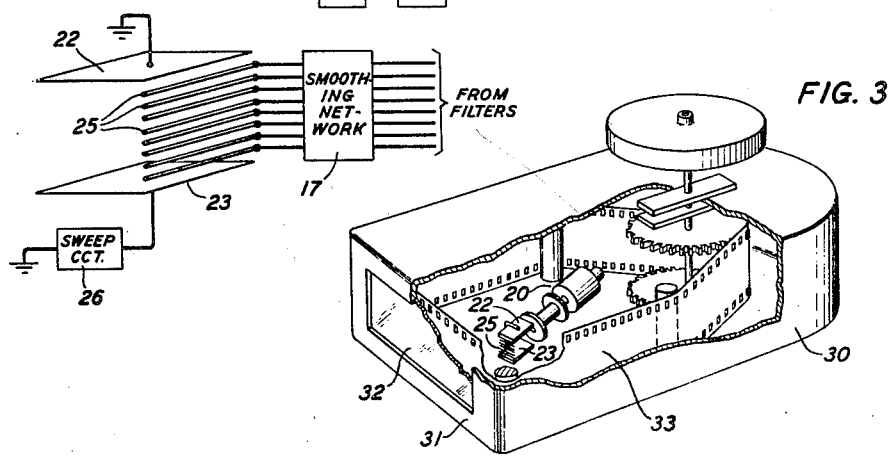
Figs. 3 and 3A illustrate a modification of the oscilloscope of the Fig. 1 arrangement, whereby a visual pattern of the type illustrated in Fig. 3B may be obtained.
Fig. 4 and Fig. 5 show another arrangement in accordance with the invention.

Figs. 3 and 3A show another arrangement for analysis and visual representation of speech-bearing waves embodying an oscilloscope including a plurality of wire or rod electrodes respective to component frequencies or frequency bands of the waves under examination. The oscilloscope may be substantially similar to the type shown in the present inventor's United States Patent 2,403,996, issued July 16, 1946, for "Electron discharge apparatus," modified to include the wire or rod electrodes. The oscilloscope of Figs. 3 and 3A comprises an enclosing vessel 30 for an electron gun 20, a pair of spaced plates 22, 23 and associated sweep circuit 26 for repeatedly and cyclically causing the electron beam provided by the electron gun to be deflected or moved back and forth substantially along a line between extreme positions herein indicated as along a vertical path and a plurality of horizontally arranged spaced wire or rod electrodes 25, disposed transversely to the path along which the electron beam is caused to be swept. The end portion 31 of the vessel toward which the beam is directed may be provided with a transparent, elongated window portion 32 across which, in the manner described in the referenced Patent No. 2,403,996, a flexible transparent band or tape 33, coated on its inner surface with a fluorescent material, may be caused to move at a preassigned suitable rate. The electrodes 25 may be connected as illustrated in Fig. 3A, to a source of speech-bearing waves through the network 17 as in the Fig. 1 arrangement. In the arrangement of Figs. 3 and 3A, as the electron beam is swept back and forth between its extreme positions between the deflector plates 22, 23, the outputs of the filters applied to the electrodes 25 through the network 17 will cause the intensity of the electron beam to vary from instant to instant in accordance with the variation in the amplitude of the signals applied to the electrodes 25 from instant to instant. The trace that would be produced on the electron beam sensitized band of the oscilloscope would be a straight line varying in intensity along its length, which lengthwise dimension would correspond to a frequency coordinate, and for any one sweep of the electron beam would evidence for that scanning of the frequency range of the received waves the variation in amplitude with frequency of the wave. Successive sweeps of the electron beam evidence the next succeeding variation of amplitude with frequency relationship existing in the received waves and would appear on the band adjacent the preceding trace. As successive traces are thus obtained, a pattern for the received waves may be built up, which pattern will be visible to an observer through the window 32. The normal adjustment of the electron beam, that is, without signal input or with a preassigned minimum signal input to the rod electrodes, could be such that the luminous spot formed thereby on the fluorescent screen provided by the band 33, would be a minimum, with maximum luminousness or effect with maximum input to the rod electrodes. Variation in the amount of separation between the wire or rod electrodes will vary the degree of smoothing obtained between frequency bands. Fig. 3B illustrates the character of the visual pattern that would be obtained in this way.

Figs. 4 and 5 illustrate another embodiment of the invention. This arrangement comprises a speech wave pick-up device or microphone 10, a plurality of frequency selective channels 40 each including a band-pass filter 41 and detector circuit 42, and an oscilloscope 50. Each filter is selective to a different band or portion only of the frequency range expected to be embraced by the speech-bearing waves to be analyzed and visually represented on the fluorescent screen of the oscilloscope. The detecting circuit respective to each filter derives a control signal from the output of the filter that deflects the amplitude or intensity of the respective component frequency band, and its variations with successive time intervals during the period in which the particular speech-bearing waves are sustained. The oscilloscope comprises a tubular vessel portion 43, adapted for rotative movement, as indicated by the arrow, and including a cylindrical fluorescent screen portion 44. The vessel encloses an electron gun 20 and a pair of horizontally disposed, spaced deflector plates 45, 46 and associated sweep circuit 47 for repeatedly and cyclically deflecting or moving the electron beam back and forth between preass'gned extreme positions so as to traverse a vertical path on the screen against which the beam is directed. The repeated, sweeping movement of the electron beam occurs between a plurality of pairs of auxiliary, vertically arranged, spaced deflector plates 48, individual pairs of which are respective to a particular one of the frequency selective channels 40. In operation, the speech waves received by the microphone are converted into complex electric waves corresponding thereto, and the latter are divided into a plurality of component frequencies or frequency bands by the filters, and signal currents respective thereto derived from the filter outputs by the detector circuits. As the signal currents from the respective frequency selective channels are applied to the deflector plates 48, the electron beam that is being swept between them is subjected to successive lateral deflections or displacements as it traverses the region between each pair of plates 48. Initially, and for a condition of preassigned minimum input to the array of deflector plates 48, the electron beam will be prevented from access to the screen by the masking electrode 49. As the input to respective pairs of plates 48 exceeds the required minimum signal strength, the intensity of the beam effective on the screen is varied by deflecting or moving it across the edge of the masking electrode. Since the screen is rotating at a rate of movement correlated with the rate at which the electron beam is being repeatedly swept between its extreme positions within the array of deflector plates 48, successive adjacent luminous traces are formed on the screen with successive electron beam sweeps, and a visual pattern respective to the received speech waves is built up on the oscilloscope screen. In this pattern, each vertical trace provides a frequency dimension or coordinate as well as an intensity or wave amplitude dimension, and the rotative movement of the screen provides a time dimension or coordinate for the pattern. In this arrangement, as in that of Figs. 1 and 2, the complex wave to be analyzed and visually represented, is divided up into a plurality of component frequencies or frequency bands the specific frequency content of which and the intensity or amplitude with frequency of which are varying from instant to instant, and concomitantly varying signals respective to each such component frequency or frequency band are derived therefrom, and such signals are applied to the array of deflector plates of the Fig. 4 arrangement and electronically scanned by the electron beam many times a second. In the arrangement of Fig. 4, as in that of Fig. 3, the visual pattern or representation obtained of the speech-bearing waves is of the same general type as that heretofore described as obtainable with specifically different means and method in the present inventor's United States Patent 2,403,997, of July 16, 1946.

Although the present invention has been described with reference to certain specific embodiments, it will be evident that it is not limited thereto, and that modifications therein without departing from the spirit or scope of the invention will occur to the skilled in the art.

What is claimed is:

1. In combination, an oscilloscope comprising an electron gun for producing an electron beam, a first pair of spaced plate electrodes, a second pair of spaced electrodes extending substantially at right angles to said first pair of electrodes, one of said second pair of electrodes comprising a plurality of laterally spaced parallel rods or wires, said rods or wires extending substantially parallel to the mean direction of said beam, and a fluorescent screen against which said beam is directed through the spaces defined by said pairs of electrodes, a sweep circuit connected to said first pair of electrodes for repeatedly and cyclically deflecting the electron beam in one direction substantially along a line between preassigned positions on said screen, and means connected to said second pair of electrodes for applying signal potentials to each of said wires for deflecting the electron beam in another direction and to an extent determined substantially by a characteristic of the signal potentials on each of said wires as the electron beam is swept past individual wires.

2. The combination of claim 1 in which said one direction along which the electron beam is adapted to be swept has the significance of a frequency dimension and the said other direction in which the electron beam is adapted to be deflected has the significance of an amplitude dimension of the signal potentials applied to said wires.

3. In combination, a receiver of speech-bearing waves, frequency selective means for separating the frequency range of said waves into a plurality of component frequency bands, an oscilloscope including a fluorescent screen and means for directing an electron beam against said screen, means including a pair of spaced electrodes in said oscilloscope for repeatedly and cyclically moving said beam between separated points along said screen, means including additional electrodes in said oscilloscope for deflecting said beam in its movement along said screen, said additional electrodes being so positioned that they are encountered by said beam in succession in its movement along said screen, and means interconnecting said last-mentioned and said frequency selective means for applying respective ones of said frequency bands to respective ones of said additional electrodes.

4. The combination of claim 3 in which a wave smoothing network is included in said interconnecting means.

5. In combination, an oscilloscope comprising an electron gun for generating an electron beam, a first pair of spaced electrodes, a plurality of additional pairs of spaced electrodes, each of said additional pairs being located so as to be able to influence said beam substantially independently of the other of said additional pairs for a particular position of said beam, and a fluorescent screen against which said beam is adapted to be directed through the spaces defined by said pairs of electrodes, a sweep circuit connected to said first pair of electrodes for repeatedly and cyclically moving the electron beam along a path between separated portions on said screen, and means connected to said plurality of additional pairs of electrodes for applying signal potentials to each of said additional pairs of electrodes for deflecting the electron beam laterally of said path and to an extent determined substantially by a characteristic of the signal potentials on each of said additional pairs of electrodes as the electron beam is swept through individual pairs of said electrodes.

6. In combination, an oscilloscope comprising an electron beam source and an electron beam sensitized surface against which the beam is adapted to be directed, means for moving the electron beam through a path respective to separated points on said sensitized surface, and a plurality of separate beam controlling means interposed in the path along which said beam is moved and so positioned that they are encountered separately and in succession by said beam as it moves along said path for successively controlling the intensity of the effect of the beam on the sensitized surface.

7. In combination, a source of complex waves, frequency selective means for separating the frequency range of said waves into a plurality of component frequency bands, an oscilloscope including a fluorescent screen and means for directing an electron beam against said screen, means for repeatedly and cyclically moving said beam between limits on said screen, and a plurality of separate beam controlling means operative on said beam at respective different positions of said beam between said limits and responsive to respectively corresponding different component frequency bands.

8. In combination, a source of complex waves, frequency selective means for separating the frequency range of said waves into a plurality of component frequency bands, an oscilloscope including a fluorescent screen and means for directing an electron beam against said screen, means for repeatedly moving said beam between limits on said screen, and means for deflecting said beam at respective successive different positions of said beam between said limits in accordance with respective different component frequency bands.

9. In combination, a receiver of complex waves, a plurality of filters for resolving the received waves into a corresponding plurality of frequency components, a cathode ray tube having a fluorescent screen of which different portions are respective to the corresponding different frequency components, means for moving the cathode ray over said portions successively and repeatedly, and a multiplicity of separate ray controlling means operative in succession on said ray as said ray is moved over said portions and responsive to respectively corresponding different frequency components.

10. In combination, a receiver of complex waves, frequency selective means for resolving the waves into a plurality of component frequency bands, an oscilloscope having an electron beam source and a fluorescent screen against which the beam is adapted to be directed, means for moving said beam repeatedly over said screen between limits thereon, and a plurality of beam controlling means respective to said plurality of component frequency bands operative in succession on said beam during each said movement.

11. In combination, an oscilloscope comprising an electron beam source, an electron beam sensitized surface against which the beam is adapted to be directed, means for moving the electron beam repeatedly through an accurate path, a plurality of separate electron beam controlling means so positioned that they control the beam in succession as it moves through said path, and means connected to said last-mentioned means for applying signal waves respective to different frequency bands to respective beam controlling means for varying the effect of the beam on said sensitized surface in accordance with a characteristic of said frequency bands.

12. The combination of claim 11 wherein the means connected to said separate beam controlling means comprises a receiver of complex waves, a plurality of frequency selective channels for dividing the frequency range of said waves into component frequency bands, and individual circuit connections respective to specific channels and specific beam controlling means.

13. In combination, an oscilloscope comprising an electron beam source, an electron beam sensitized surface against which the beam is adapted to be directed, means for moving the electron beam repeatedly through an arcuate path, a plurality of separate electron beam controlling means so positioned that they are encountered by the beam in succession as it moves through said path, and means connected to said separate beam controlling means for applying signal waves thereto for successively varying the effect of the beam on said sensitized surface in accordance with a characteristic of the signal waves.

14. In combination, an oscilloscope comprising an electron beam source, an electron beam sensitized surface against which the beam is adapted to be directed, means for moving the beam repeatedly between separated points on said sensitized surface, a plurality of separate beam controlling means so positioned that they are encountered by the beam in succession as it moves between said separated points, and means for applying signal waves to said separate beam controlling means for varying the effect of said beam on said sensitized surface at different positions of said beam in its movement.

15. In combination, an oscilloscope comprising an electron beam source, an electron beam sensitized surface against which the beam is adapted to be directed, means for moving the beam along a transverse path to impinge in succession on separated points of said sensitized surface, a plurality of separate beam controlling means disposed along said path and so positioned that they control the beam separately and in succession as it moves along said path, and means for applying signals to said separate beam controlling means for varying the effect of said beam on said sensitized surface at respectively corresponding different positions of said beam along said path of movement.

16. The combination of claim 15 in which said plurality of separate beam controlling means comprises a plurality of pairs of spaced plate electrodes disposed adjacently, the electron beam being adapted to be moved between said plate electrodes in succession during said movement of said beam.

17. The combination of claim 15 in which said plurality of separate beam controlling means comprises a plurality of rod or wire electrodes disposed in spaced adjacent relationship and defining with an elongated electrode a space through which said electron beam is moved.

18. The combination of claim 15 in which said plurality of separate beam controlling means comprises rod or wire electrodes disposed in spaced adjacent relationship and arranged so that the electron beam moves across said electrodes in succession during movement through said path.

19. In combination, an electric discharge device comprising a sensitized surface and means for directing an electric discharge beam against said surface, means for sweeping said beam repeatedly through a predetermined path, a multiplicity of separate beam controlling means spaced along said path and so positioned that they control the beam successively as it is swept through said path, and means for applying individual control effects to said separate beam controlling means for successively varying the effect of said beam on said sensitized surface.

20. In combination, an electric discharge device comprising a sensitized surface and means for directing an electric discharge beam against said surface, a multiplicity of individual beam-controlling electrodes, and beam deflecting means for deflecting said beam past the different said electrodes in succession, whereby the beam is subjected to successive different control effects.

RALPH K. POTTER.

REFERENCES CITED

The following references are of record in the file of this patent:

UNITED STATES PATENTS

| Number | Name | Date |
| --- | --- | --- |
| 2,055,174 | Kwartin | Sept. 22, 1936 |
| 2,076,086 | Ladner | Apr. 6, 1937 |
| 2,159,790 | Freystadt et al. | May 23, 1939 |
| 2,403,985 | Koenig | July 16, 1946 |
| 2,403,986 | Lacy | July 16, 1946 |